Dec. 30, 1969     O. R. HARRISON     3,486,723
CARGO BARRIER NET
Filed March 8, 1968     2 Sheets-Sheet 1
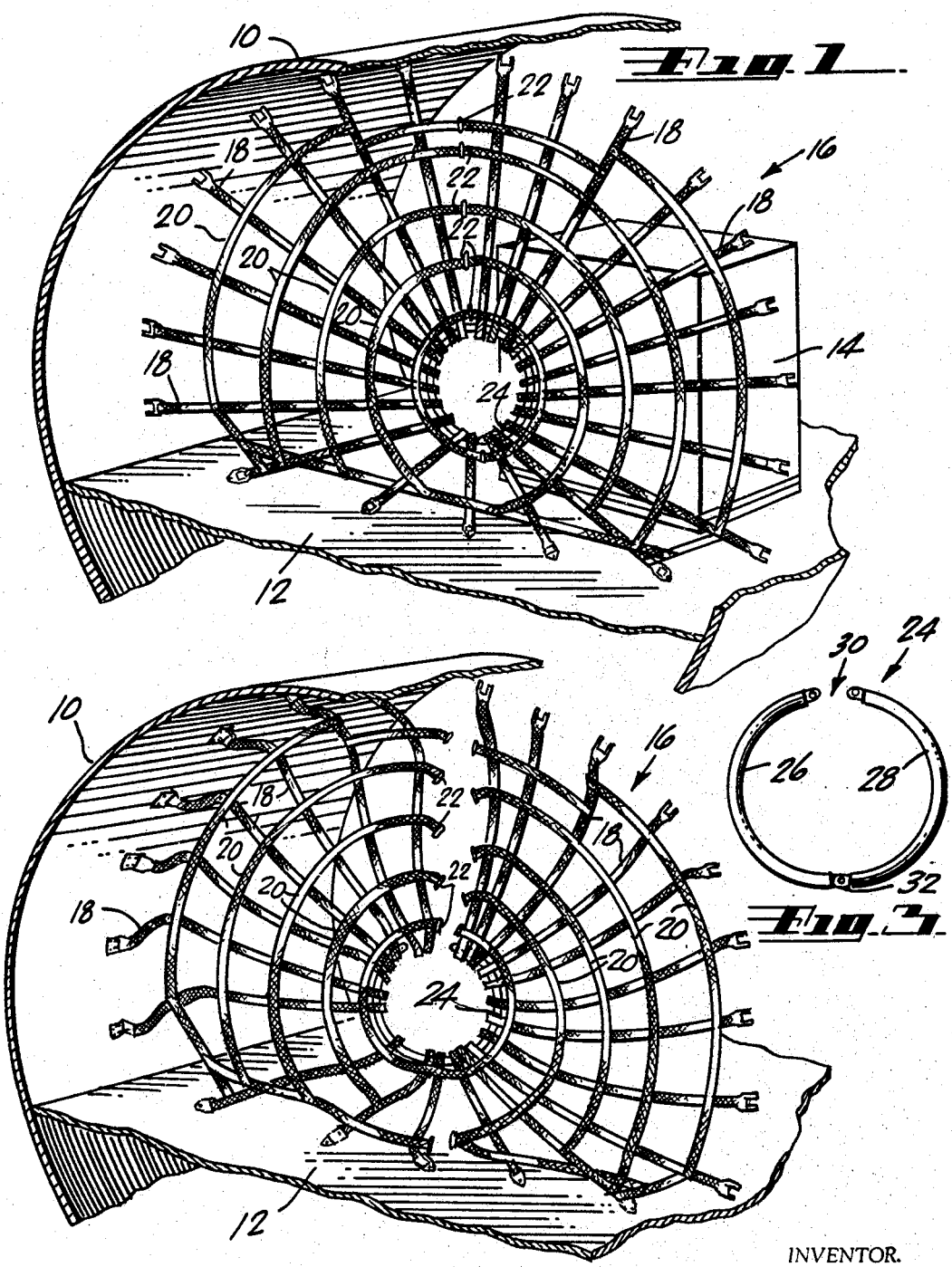
INVENTOR.
OLLIE R. HARRISON
BY
Jack E. Munro
AGENT-

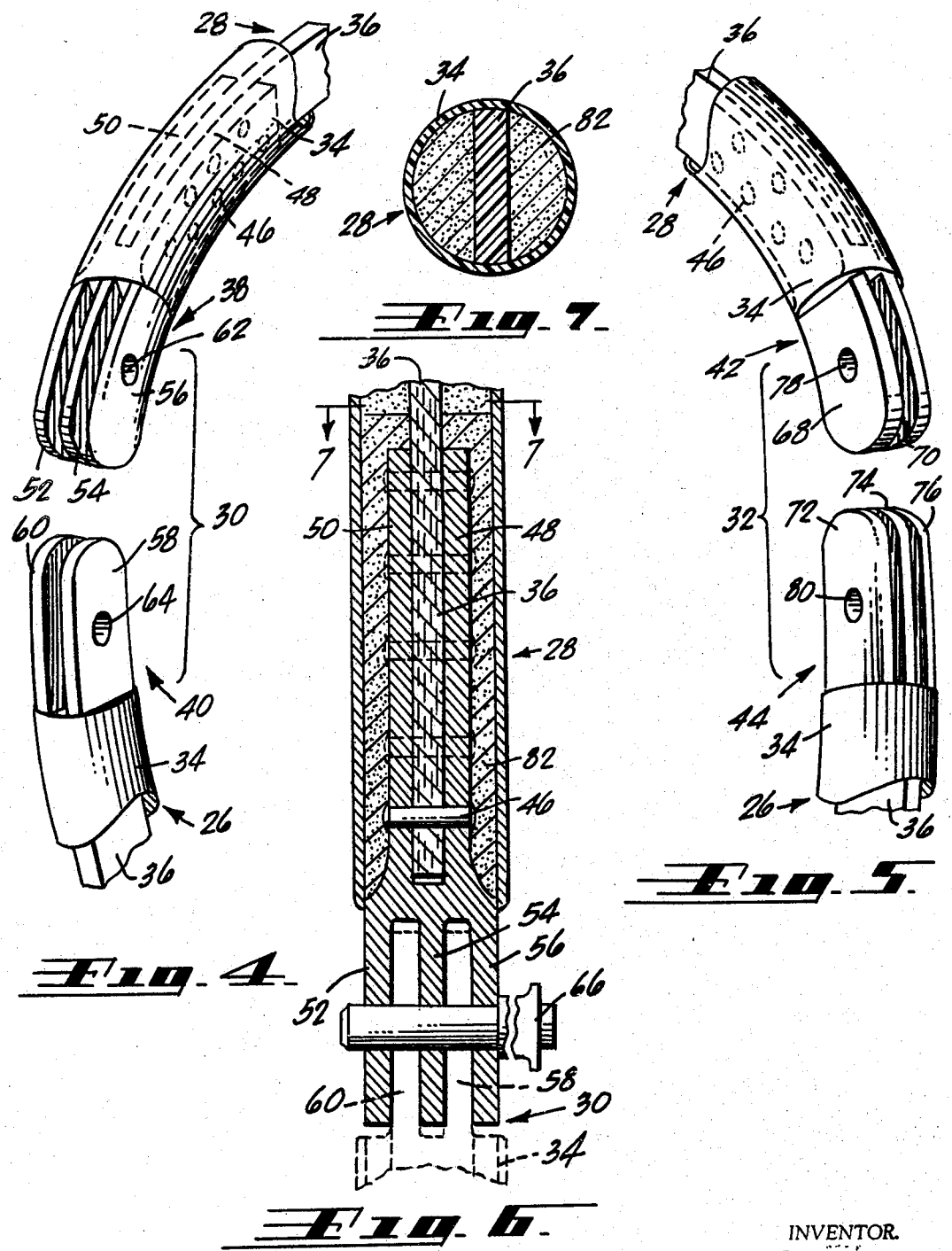

United States Patent Office 3,486,723
Patented Dec. 30, 1969

3,486,723
CARGO BARRIER NET
Ollie R. Harrison, Torrance, Calif., assignor to McDonnell Douglas Corporation, a corporation of Maryland
Filed Mar. 8, 1968, Ser. No. 711,542
Int. Cl. B64d 9/00
U.S. Cl. 244—118                                     5 Claims

ABSTRACT OF THE DISCLOSURE

A cargo barrier net which includes a ring formed centrally within the cargo net, the ring capable of splitting and pivoting at one point making an aperture in the net which allows easy movement therethrough of a human being.

BACKGROUND OF THE INVENTION

In cargo carrying vehicles various devices have been employed for preventing cargo movement during vehicle movement. In aircraft such devices as tie down rings, straps, nets and latches are commonly used to prevent cargo movement. However, in event of a failure of such tie down means there is no other restraint against forward movement of the cargo other than the conventional bulkhead which separates the flight crew from the cargo area. Bulkheads now commonly in use are adequate to resist normal flight shifting of the cargo but, by reason of their relative weakness in the direction of the longitudinal axis of the fuselage, are inadequate to resist impact loads brought about by crashes, emergency landings, or other situations causing rapid decceleration. To design conventional bulkheads which would protect the flight crew under such conditions, substantial reinforcement of the bulkhead would be necessary.

A common means to protect aircraft bulkheads is a cargo barrier net which is mounted at the forward end of the cargo compartment and adjacent the bulkhead. Such cargo barrier nets are of substantial strength being designed to take a crash load condition as great as nine G's in combination with the cargo handling system.

Quite frequently it is necessary for a member of the crew to move into the cargo area (the rear portion) of the aircraft. A barrier net which does not include an opening therein to permit crewmember passage would prevent such movement. The prior art in some instances has designed the barrier net to include a door like aperture. However, as the strength of the barrier net is of utmost importance, to open an close such a door in the barrier net was a long and tedious procedure usually requiring a series of separate steps to unbuckle and buckle a plurality of straps. Further, such a door required additional net structure to compensate for the inherent loss of net strength due to inclusion of the door.

SUMMARY OF THE INVENTION

The apparatus of this invention provides for the inclusion of a central ring within the spider-web type of cargo barrier net. The barrier net is formed of webbing, one end of each webbing strip being attached to the aforementioned ring. The ring can be symmetrically split with the two tubular segments being pivotally connected together at one point. The ring can assume an opened condition to easily permit passage therethrough of a human being. The ring is constructed of an interior elongated member which is formed of a glass impregnated material, the elongated member being contained within each of the tubular segments. Each tubular segment is fixedly attached to its respective elongated member. Bifurcated fittings are affixed to the terminals of the rod which permit the opening and closing of the ring.

One advantage of the apparatus of this invention is to provide structure within a cargo barrier net which can permit crewmember movement therethrough without affecting the strength requirements of the entire barrier net.

Another advantage of this invention is to provide a structure which can be easily opened and closed manually.

Although this invention has been discussed in connection with aircraft, it is to be remembered that the aforesaid structure may be found to be advantageously employed in any environment in which such a barrier net is believed to be required. Also, other advantages of the invention, not specifically enumerated above, are believed to become apparent as the description of the invention proceeds.

BRIEF DESCRIPTION OF THE DRAWING

FIGURE 1 is a perspective view of the ring of this invention shown in connection with a cargo barrier net assembly in its closed or operable position;

FIGURE 2 is a perspective view similar to FIGURE 1 showing the barrier net assembly in the open position capable of permitting passage of a human being through the assembly;

FIGURE 3 is a front view of the split ring of applicant's invention in the open position;

FIGURE 4 is a perspective view of the opening and closing connection between the two segments of the split ring shown in FIGURE 3;

FIGURE 5 is a perspective view of the pivoting connection of the split ring shown in FIGURE 3;

FIGURE 6 is a cutaway side view of the connection shown in FIGURE 4; and

FIGURE 7 is a cutaway view taken along lines 7—7 of FIGURE 6.

DESCRIPTION OF THE SHOWN EMBODIMENT

Referring particularly to the drawing, there is shown an aircraft fuselage 10 having a cargo floor 12 mounted therein upon which is supported a cargo element 14. Attached to the fuselage 10 and cargo floor 12 is a spider-web type of barrier net 16 being formed of radial strips of webbing 18 and concentric webbing strips 20. Concentric webbing strips 20 are connected through a buckle 22 approximately in line with the central vertical axis of the fuselage 10. The view of the barrier net 16 shown in FIGURE 1 and FIGURE 2 of the drawing would be approximately the view as would be seen by a crewmember of the aircraft looking aft to the cargo area.

The radial webbing strips 18 terminate from the fuselage 10 by being attached to a ring 24. Ring 24 is comprised of two equal segments, first segment 26 and second segment 28. Segments 26 and 28 are connected together through a first connection 30 and a second connection 32. Each of the segments 26 and 28 is constructed of the same material and in the same manner. Each of the segments 26 and 28 comprises an outer tubular member 34 and an axial supporting element 36. Contained within each of the tubular members 34 in the space provided between the axial supporting element 36 of the tubular member 34 is a filler 82 such as a rigid urethane foam. Filler 82 functions to maintain proper alignment of the axial supporting elements 36. The axial supporting element 36 of each of the segments 26 and 28 is confined within the length of its specific tubular member 34. Attached to each of the terminal ends of the axial supporting elements 36 are fittings 38, 40, 42 and 44. Each of the fittings 38, 40, 42 and 44 is securely affixed to its respective axial supporting element 36 by attaching means such as rivets 46. However, any other attaching means could be employed such as screws, bolts, etc., it only being necessary that a substantially strong connection be achieved. Each of the fittings 38, 40, 42 and 44 are bifurcated forming arm members 48 and 50 between which is held the axial supporting element 36. The arm members 48 and 50 are only shown with respect to fitting 38, however, it is to be understood that fittings 40, 42 and 44 include similar structure to attach the fitting to the axial supporting element 36. Rivets 46 securely retain the axial supporting element 36 between the arm members 48 and 50.

Fitting 38 which is attached to one end of second segment 28 is trifurcated on its free end forming depending arms 52, 54 and 56. Fitting 40 which is connected to one end of first segment 26 is bifurcated into depending arms 58 and 60. Fittings 38 and 40 comprise a first connection 30 with the depending arms 58 and 60 capable of sliding contact in the spaces provided between depending arms 52, 54 and 56. First connection 30 is the connection which is opened and closed by the crew member desiring passage through the barrier net 16. With the connection 30 in the fully closed position as shown in FIGURE 6, apertures 62 and 64 coincide and permit entrance of lock bolt 66. Lock bolt 66 functions to retain connection 30 in the closed position.

Second connection 32 is similar to connection 30. Fitting 42 which is connected to second segment 28 is bifurcated into depending arms 68 and 70. Fitting 44 which is connected to first segment 26 is trifurcated into depending arms 72, 74 and 76. Fittings 42 and 44 coact in the same manner as do fittings 38 and 40 with their respective apertures 78 and 80 coinciding to permit access of a second lock bolt 66. Usually the second connection 32 functions as a mere pivotal connection whereby lock bolt 66 need not be removed during the opening and closing of the first connection 30.

The operation of the barrier net assembly of this invention is as follows: With the barrier net 16 in the closed position shown in FIGURE 1, webbing members 18 and 20 are in a state of tension with ring 24 assisting in this function. With the barrier net 16 as shown in FIGURE 1, a substantial force can be absorbed by the net through contaction thereby of a cargo element 14.

If it is desired by a crewmember to pass through the barrier net 16 the crewmember need only to unlatch buckles 22 and remove lock bolt 66 of first connection 30. Thereupon, the first and second segments 26 and 28 of the ring 24 can be rotated such that a substantial opening in net 16 is achieved.

When in operation, upon contaction of an element of cargo 14 into the barrier net 16, the resultant force causes a slight extension of the axial supporting elements 36. It has been found that if the axial supporting elements 36 are composed of a fiber impregnated glass, maximum force absorbtion characteristics are achieved. However, any other material which can give the desired results would be satisfactory. The outer tubular members 34 of segments 26 and 28 are bonded to or otherwise fixedly secured to their respective fittings. This bonding of the members 34 to their respective elements 36 causes a portion of the force to be absorbed through the tubular members 34. This permits the tubular members 34 to function as supporting elements thereby maintaining the cross sectional area of the elements 36 at a minimum.

Minor modifications of the device, varying from the embodiment illustrated and described herein, may be resorted to without departing from the spirit and scope of this invention.

I claim:
1. A cargo barrier net assembly for installation in a vehicle to prevent movement of articles of cargo from one area to another area comprising:
a plurality of radial webbing strips, one end of each of said strips being connected to said vehicle, the other end of each of said strips being connected to a ring, said ring including a plurality of segments interconnected by a plurality of connectors, at least one of said connectors being detachable whereby said ring may be opened to permit passage of an object therethrough.
2. An apparatus as defined in claim 1 wherein:
said ring includes two segments, each of said ring segments including an outer tubular shell, an elongated supporting member contained within each of said shells, each end of said elongated supporting member terminating in a fitting, a first pair of said fittings one from each of said ring segments cooperating to form a pivotal connection, a second pair of said fittings one from each of said ring segments cooperating to form an opening and closing connection, said tubular shell of each of said ring segments being fixedly attached to its respective elongated supporting member.
3. An apparatus as defined in claim 2 wherein:
a filler material being contained within each of said tubular shells in the spacing between said shell and its elongated supporting member whereby said filler maintains proper alignment of said elongated supporting members with respect to said shells.
4. An apparatus as defined in claim 1 further comprising:
a plurality of concentric webbing strips secure to said radial webbing strips at their points of interception, each of said concentric webbing strips including two free ends and said free ends being connected by a detachable connector whereby said net may be opened to permit passage of objects therethrough.
5. An apparatus as defined in claim 4 wherein:
said ring includes two segments, each of said ring segments including an outer tubular shell, an elongated supporting member contained within each of said shells, each end of said elongated supporting member terminating in a fitting, a first pair of said fittings one from each of said ring segments cooperating to form a pivotal connection, a second pair of said fittings one from each of said ring segments cooperating to form an opening and closing connection, said tubular shell of each of said ring segments being fixedly attached to its respective elongated supporting member.

References Cited

UNITED STATES PATENTS 2,669,402  2/1954  Delmar _____ 244—121
3,099,313  7/1963  Peck et al. _____ 105—369

MILTON BUCHLER, Primary Examiner

THOMAS W. BUCKMAN, Assistant Examiner

U.S. Cl. X.R.

105—369